(12) United States Patent
Cox

(10) Patent No.: US 9,946,814 B1
(45) Date of Patent: Apr. 17, 2018

(54) SYSTEM, METHOD, APPARATUS, AND COMPUTER PROGRAM PRODUCT FOR GENERATING A POWER CABLING PLAN FOR A COMPUTING SYSTEM

(71) Applicant: VCE Company, LLC, Richardson, TX (US)

(72) Inventor: Timothy Allen Cox, Bellingham, MA (US)

(73) Assignee: VCE IP Holding Company LLC, Richardson, TX (US)

( * ) Notice: Subject to any disclaimer, the term of this patent is extended or adjusted under 35 U.S.C. 154(b) by 816 days.

(21) Appl. No.: 14/460,695

(22) Filed: Aug. 15, 2014

(51) Int. Cl.
*G06F 17/50* (2006.01)

(52) U.S. Cl.
CPC .................................. *G06F 17/50* (2013.01)

(58) Field of Classification Search
None
See application file for complete search history.

(56) References Cited

U.S. PATENT DOCUMENTS

| 6,902,069 B2* | 6/2005 | Hartman | H05K 7/1491 211/26 |
| 2011/0161877 A1* | 6/2011 | Chapra | G06F 17/50 715/810 |

\* cited by examiner

Primary Examiner — Craig Dorais
(74) Attorney, Agent, or Firm — Womble Bond Dickinson (US) LLP

(57) ABSTRACT

A method for generating a power cabling plan may include accessing a build plan. The build plan may identify a set of power drawing components and a set of PDUs. Each PDU may include at least one circuit. The method may further include iteratively assigning each of the power drawing components to at least one circuit based on an existing power load assigned to each circuit. The method may additionally include reassigning at least one power drawing component between circuits in a circuit pair if a difference in assigned power loads between circuits in any circuit pair is reducible. The method may also include generating a power cabling plan defining at least one assigned PDU port for each power drawing component. Each assigned PDU port may correspond to a circuit to which the power drawing component has been assigned.

20 Claims, 8 Drawing Sheets

| 1 402 | | | 2 404 | | |
|---|---|---|---|---|---|
| CAB SN | | | CAB SN | | |
| RU42 | PATCH PANEL (R) A | | RU42 | PATCH PANEL (R) B | |
| RU41 | | | RU41 | | |
| RU40 | | | RU40 | | |
| RU39 | | | RU39 | | |
| RU38 | | | RU38 | | |
| RU37 | 3048 A | | RU37 | 3048 B | |
| RU36 | | | RU36 | | |
| RU35 | AMP-2 C220 A | | RU35 | AMP-2 C220 B | |
| RU34 | | | RU34 | | |
| RU33 | | | RU33 | | |
| RU32 | 5548 I | | RU32 | 5548 J | |
| RU31 | 5548 G | | RU31 | 5548 H | |
| RU30 | 2U PASSTHROUGH | | RU30 | 2U PASSTHROUGH | |
| RU29 | | | RU29 | | |
| RU28 | 5548 E | | RU28 | 5548 F | |
| RU27 | 5548 C | | RU27 | 5548 D | |
| RU26 | | | RU26 | | |
| RU25 | | | RU25 | | |
| RU24 | | | RU24 | | |
| RU23 | | | RU23 | | |
| RU22 | | | RU22 | | |
| RU21 | | | RU21 | | |
| RU20 | | | RU20 | | |
| RU19 | | | RU19 | | |
| RU18 | | | RU18 | | |
| RU17 | 2U PASSTHROUGH | | RU17 | 2U PASSTHROUGH | |
| RU16 | | | RU16 | | |
| RU15 | 6296 A | | RU15 | 6296 B | |
| RU14 | | | RU14 | | |
| RU13 | | | RU13 | | |
| RU12 | 5108 C | | RU12 | 5108 D | |
| RU11 | | | RU11 | | |
| RU10 | | | RU10 | | |
| RU9 | | | RU9 | | |
| RU8 | | | RU8 | | |
| RU7 | | | RU7 | | |
| RU6 | 5108 A | | RU6 | 5108 B | |
| RU5 | | | RU5 | | |
| RU4 | | | RU4 | | |
| RU3 | | | RU3 | | |
| RU2 | | | RU2 | | |
| RU1 | | | RU1 | | |

FIG. 4

SYSTEM, METHOD, APPARATUS, AND COMPUTER PROGRAM PRODUCT FOR GENERATING A POWER CABLING PLAN FOR A COMPUTING SYSTEM

FIELD OF THE DISCLOSURE

Aspects of the disclosure relate to computing system design and, more particularly, to a system, method, apparatus, and computer program product for generating a power cabling plan for a computing system.

BACKGROUND

Converged infrastructure computing is rapidly gaining in popularity, as more and more entities deploying IT platforms are choosing to deploy converged infrastructure systems as part of an integrated information technology (IT) solution. In this regard, converged infrastructure packages multiple IT components, such as servers, data storage devices, networking equipment, and software for IT infrastructure management into a single, optimized computing solution. The integrated solution provided by a converged infrastructure can reduce complexity of deployment, increase IT infrastructure reliability, and reduce management costs compared to conventional IP platforms assembled from individually acquired and assembled components and software packages, as converged infrastructure can provide an integrated set of components selected and assembled by a single vendor into an integrated platform providing guaranteed component interoperability and software compliance. Moreover, converged infrastructure can provide an integrated pool of computing, storage, and networking resources (e.g., a cloud-based computing model) that can be shared by multiple applications and/or users.

However, given the diverse mix of components included in converged infrastructure computing systems, design specification for component placement within one or more racks that can be used to house the components of a converged infrastructure can be complex. As the set of components included in converged infrastructures and other computing systems including a mix of components is often customized specifically for a given customer's needs, the burden of system design is generally incurred for each individual computer system such that there is little reduction in design burden through economies of scale. Moreover, once a design specification has been completed, there is a need to generate documentation usable by individuals tasked with building a computing system in accordance with the design specification (e.g., contract integrators) to complete the system build in accordance with the design specification.

SUMMARY

A system, method, apparatus, and computer program product for generating a power cabling plan for a computing system, such as a converged infrastructure, are disclosed. For example, a method in accordance with some embodiments may include accessing a build plan for a rack housing at least a portion of a computing system. The build plan may identify a plurality of power drawing components and a plurality of power distribution units (PDUs). Each PDU may include at least one circuit. The method may further include iteratively assigning each of the plurality of power drawing components to at least one circuit based at least in part on an existing power load assigned to each circuit and an amount of power drawn by the power drawing component. After assigning each of the plurality of power drawing components to at least one circuit, the method may additionally include reassigning at least one power drawing component between circuits in a circuit pair if a difference in assigned power loads between circuits in any circuit pair is reducible. The method may also include generating a power cabling plan defining at least one assigned PDU port for each of the plurality of power drawing components. Each assigned PDU port may correspond to a circuit to which the power drawing component has been assigned based at least in part on the iteratively assigning and on any subsequent reassignment of one or more power drawing components if the difference in assigned power loads between circuits in any circuit pair is reducible. In accordance with some example embodiments, the power cabling plan may be automatically generated without human intervention in accordance with the method.

It will be appreciated that the above Summary is provided merely for purposes of summarizing some example embodiments so as to provide a basic understanding of some aspects of the disclosure. As such, it will be appreciated that the above described example embodiments are merely examples of some embodiments and should not be construed to narrow the scope or spirit of the disclosure in any way. It will be appreciated that the scope of the disclosure encompasses many potential embodiments, some of which will be further described below, in addition to those here summarized. Further, other aspects and advantages of embodiments disclosed herein will become apparent from the following detailed description taken in conjunction with the accompanying drawings which illustrate, by way of example, the principles of the described embodiments.

BRIEF DESCRIPTION OF THE DRAWINGS

Figure 1:
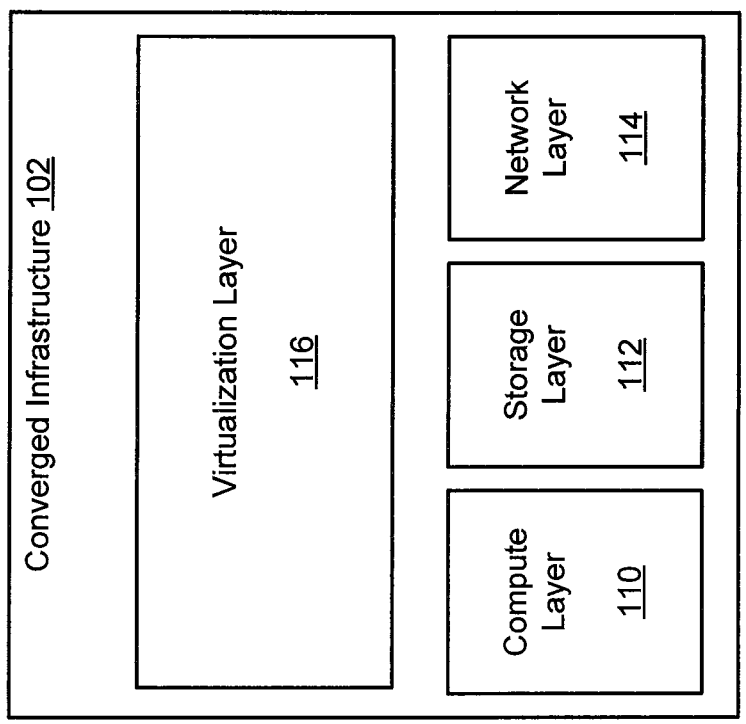
Figure 2:
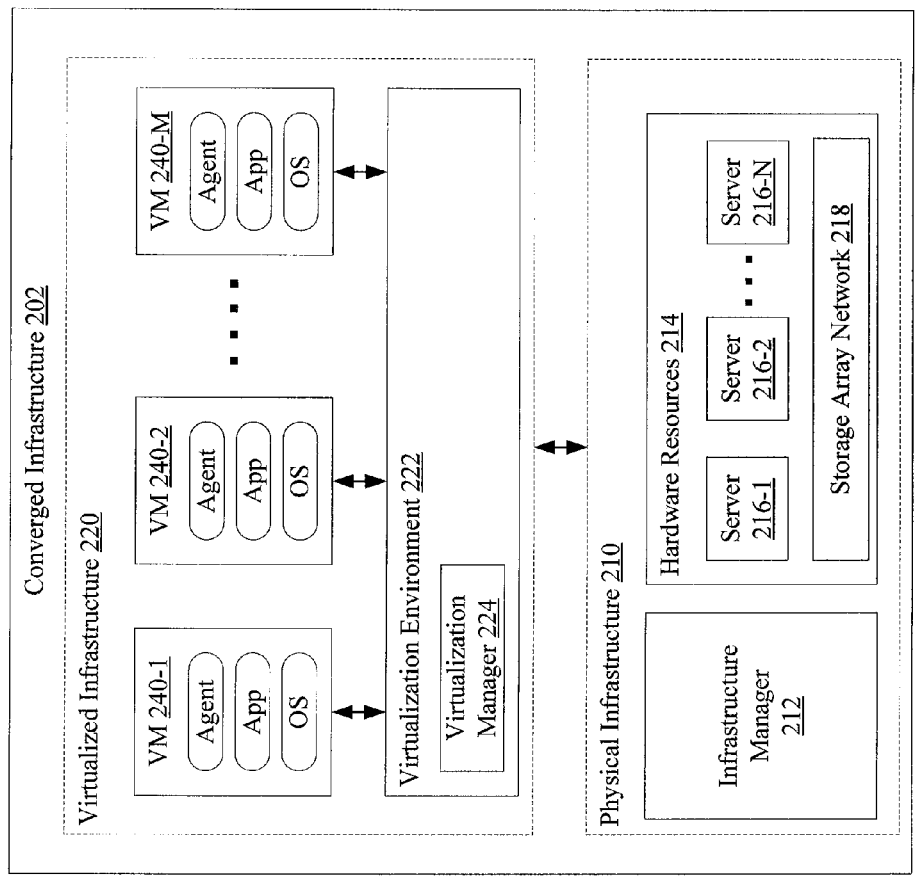
Figure 3:
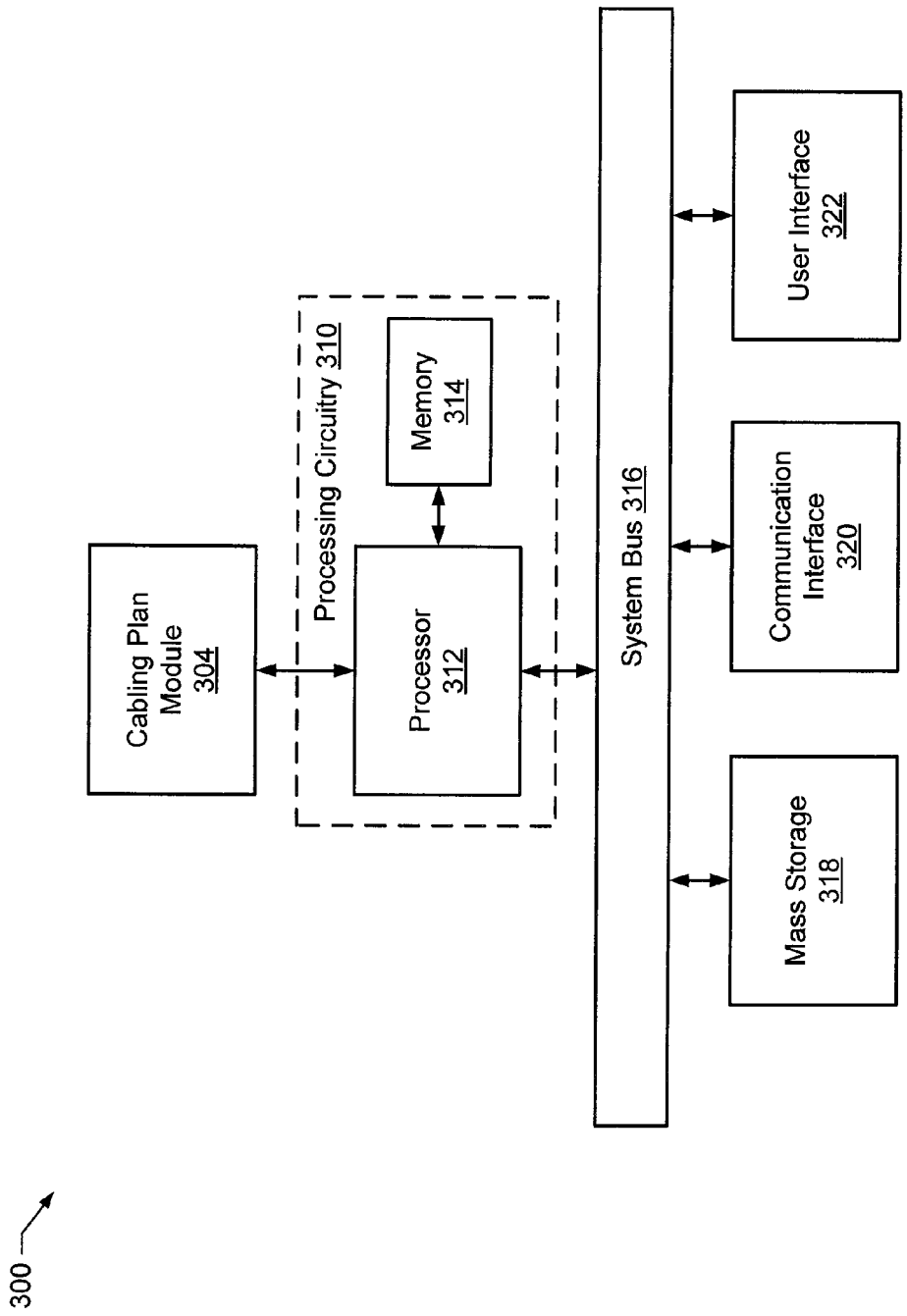
Figure 5:
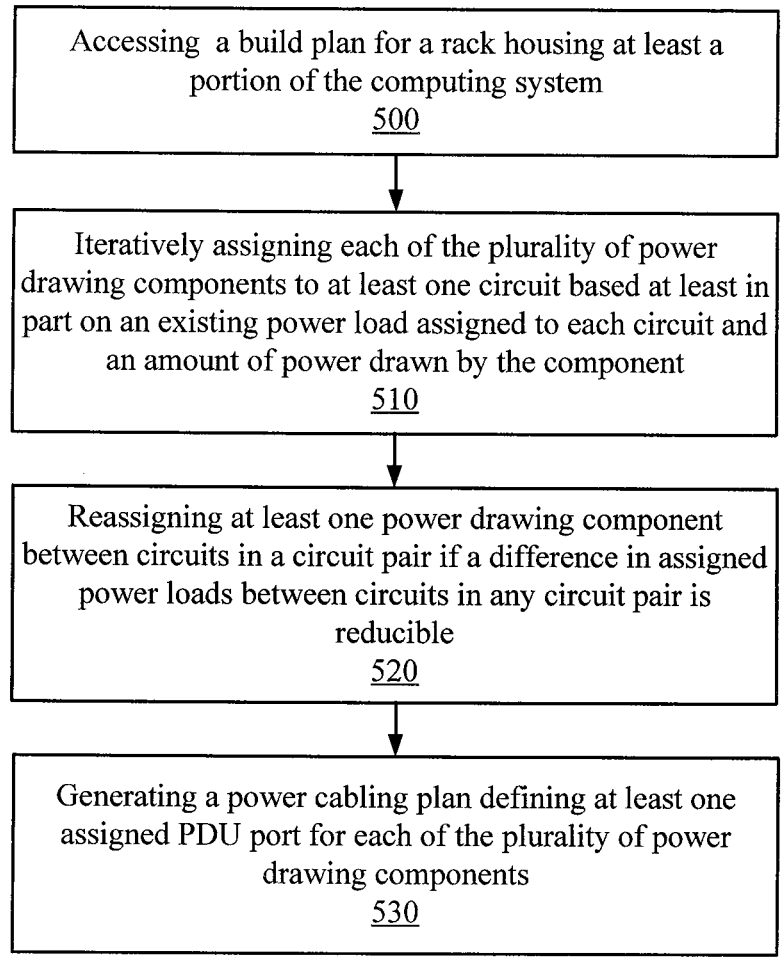
Figure 6:
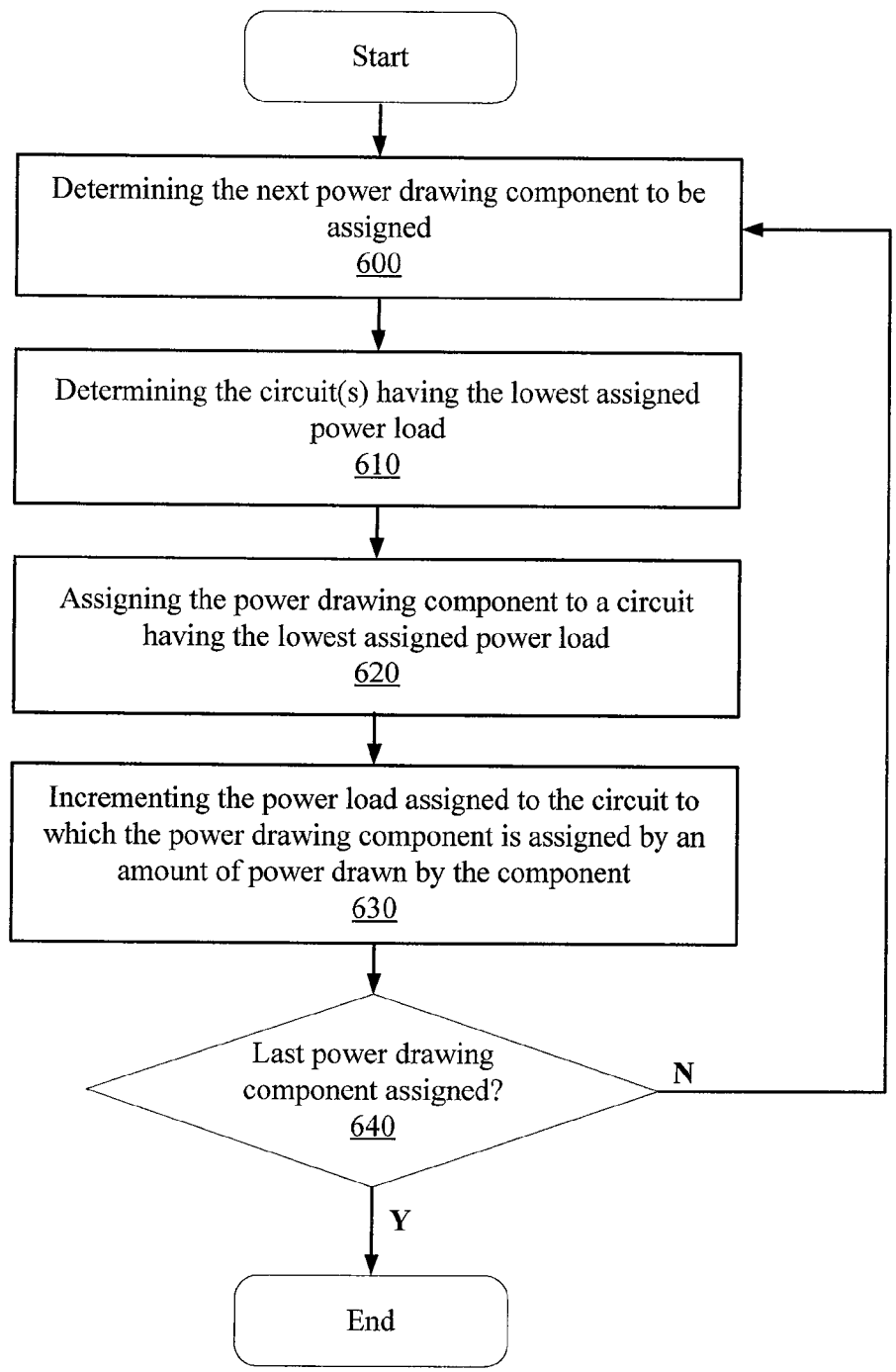
Figure 7:
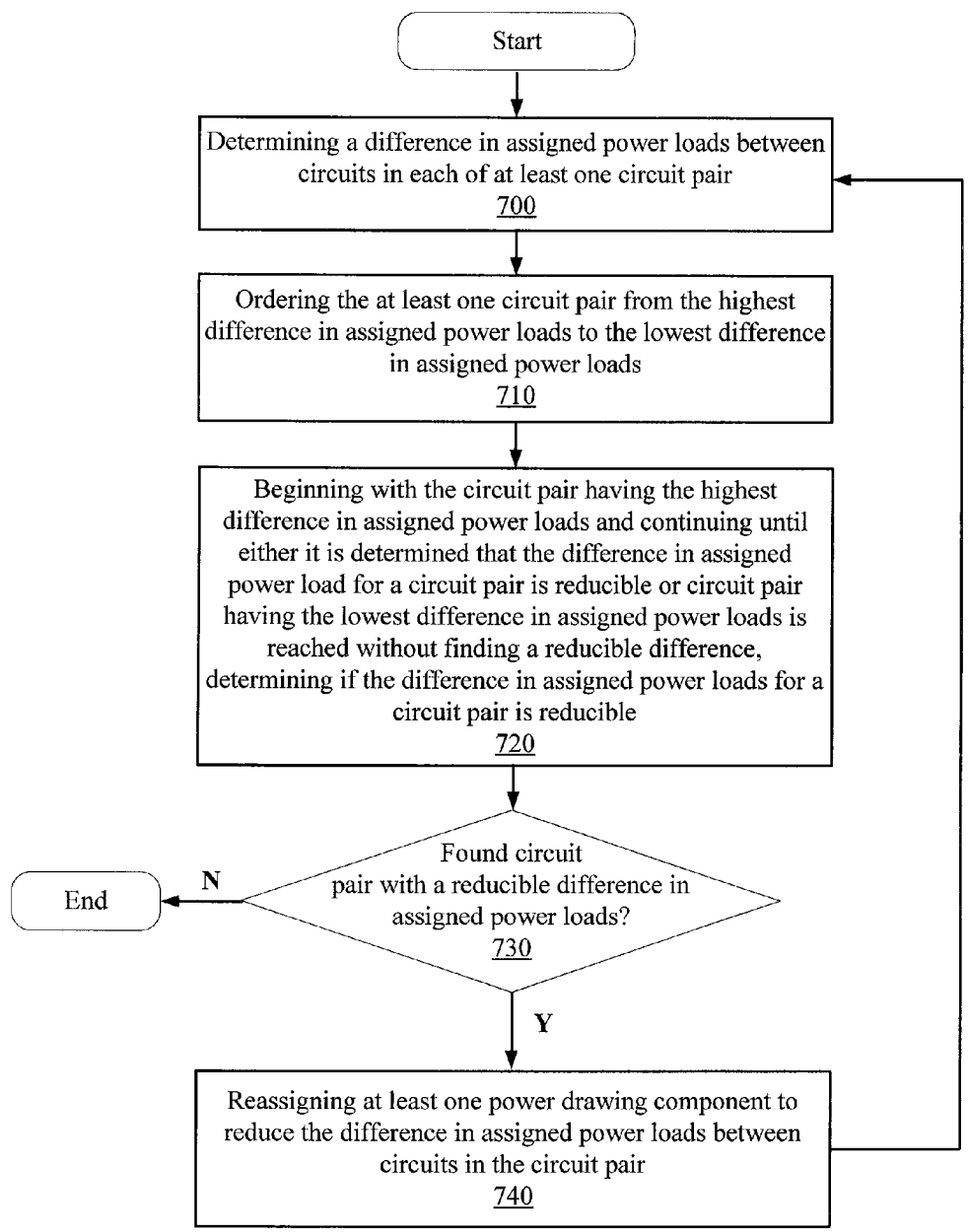
Figure 8:
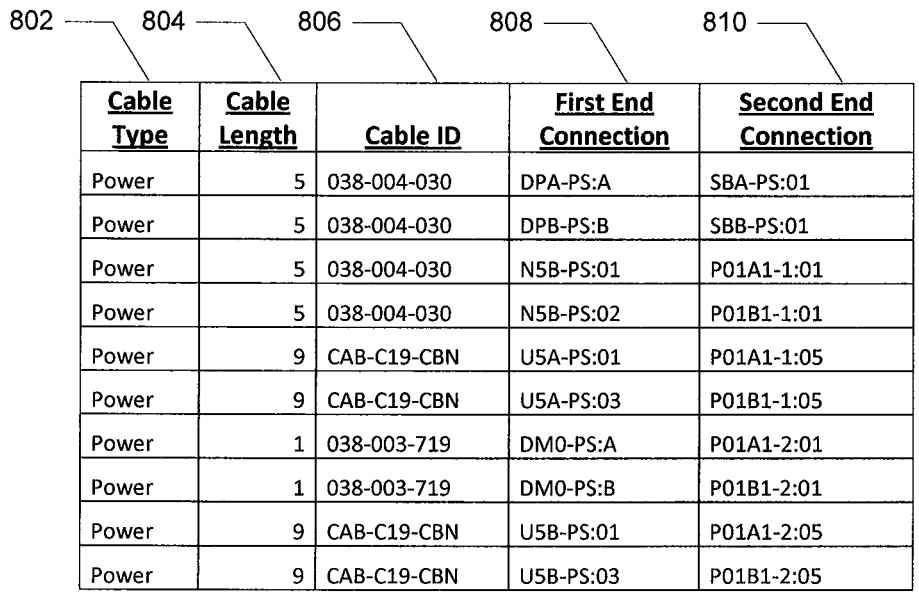

Having thus described the disclosure in general terms, reference will now be made to the accompanying drawings, which are not necessarily drawn to scale, and wherein:

FIG. 1 illustrates a block diagram of an architecture of an example converged infrastructure in accordance with some example embodiments;

FIG. 2 illustrates a block diagram of an architecture of another example converged infrastructure in accordance with some example embodiments;

FIG. 3 illustrates a block diagram of an example computing system that may be configured to generate a power cabling plan in accordance with some example embodiments;

FIG. 4 illustrates an example elevation plan that may be used to facilitate generation of a power cabling plan in accordance with some example embodiments;

FIG. 5 illustrates a flowchart according to an example method for generating a power cabling plan for a computing system in accordance with some example embodiments;

FIG. 6 illustrates a flowchart according to an example method for performing an initial iterative assignment of power drawing components to a circuit in accordance with some example embodiments;

FIG. 7 illustrates a flowchart according to an example method for reassigning power drawing components to reduce an imbalance in power loads between circuits in accordance with some example embodiments; and FIG. 8 illustrates a portion of an example power cabling plan that may be generated in accordance with some example embodiments.

DETAILED DESCRIPTION

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

Embodiments disclosed herein relate to the generation of a power cabling plan for a computing system such as a converged infrastructure that includes a plurality of components mounted in one or more racks (e.g., a rack mounted computing system). More particularly, some example embodiments implement a deterministic load balancing algorithm for automatically (e.g., without human intervention) distributing power connections for power drawing components of a computing system identified in a system build specification among available power distribution unit (PDU) circuits. Accordingly, a power cabling plan defining one or more assigned PDU ports for each power drawing component that may be mounted in a rack may be generated based on results of the load balancing algorithm. The power cabling plan may, for example, used by an individual, such as a contract integrator, as a guideline for building the computing system and/or by an owner or other operator of the computing system after build out of the computing system is completed. The algorithm implemented by various embodiments is also scalable such that it may be applied to facilitate building of a large number of computing systems that may have a variety of build specifications.

FIG. 1 illustrates a block diagram of an architecture of an example converged infrastructure 102 in accordance with some example embodiments. In this regard, FIG. 1 illustrates an example converged infrastructure for which a power cabling plan may be generated in accordance with various example embodiments. While some example embodiments are illustrated and described with respect to the generation of a power cabling plan for a converged infrastructure, it will be appreciated that various example embodiments may be applied to the generation of a power cabling plan for any type of computing system including a plurality of power drawing components housed within one or more racks. As such, it will be appreciated that the example embodiments and associated techniques described herein with respect to the generation of a power cabling plan for a converged infrastructure may be applied mutatis mutandis to other computing systems that can include a plurality of components.

The converged infrastructure 102 may include a plurality of components, such as servers, data storage devices, network equipment, and associated software, which may collectively form the converged infrastructure 102. By way of non-limiting example, in some embodiments, the converged infrastructure 102 may be implemented by a Vblock™ System available from the VCE Company, LLC of Richardson, Tex. Some example embodiments provide for the generation of a power cabling plan for connecting power drawing components of the converged infrastructure 102 to PDUs that may be used to supply power for the power drawing components.

The converged infrastructure 102 of some embodiments may include one or more compute layer 110 components, such as one or more servers (e.g., blade servers, rack servers, and/or other servers), one or more fabric extenders, one or more fabric interconnects, a chassis, and/or other compute layer components that may be implemented on a converged infrastructure to provide computing and processing resources of the converged infrastructure. The converged infrastructure 102 may further include one or more storage layer 112 components, such as one or more storage arrays and/or other mass storage devices that may be implemented on a converged infrastructure. In some embodiments, the converged infrastructure 102 may additionally include one or more network layer 114 components, such as one or more switches and/or other network layer components that may be implemented on a converged infrastructure. For example, the network layer 114 may include components that provide switching and routing between the compute layer 110 and storage layer 112 within the converged infrastructure 102. The network layer 114 may additionally or alternatively include components that provide switching and routing between the converged infrastructure 102 and a network so as to support network communication between a component(s) of the converged infrastructure 102 and a computing platform(s) independent of the converged infrastructure 102. The components of the compute layer 110, storage layer 112, and network layer 114 may collectively provide a physical infrastructure of the converged infrastructure 102.

The converged infrastructure 102 may additionally include a virtualization layer 116, which may include one or more virtualization components configured to support one or more virtualized computing environments. The components of the virtualization layer 116 may include components embodied in software, hardware, firmware, and/or some combination thereof. For example, the virtualization layer 116 may include a hypervisor and/or other virtualization components that may be configured to create and run virtual machines and/or to otherwise virtually simulate a computing environment. In some example embodiments, the virtualization layer 116 may include and/or may be communicatively coupled with one or more management components configured to support management of the converged infrastructure 102. For example, in some embodiments, the virtualization layer 116 may include a management infrastructure, which may provide management resources for managing the converged infrastructure 102. In some such embodiments, the management infrastructure may be a separate system from the converged infrastructure, but may be connected to the converged infrastructure to allow management of the entire converged infrastructure 102. In some example embodiments, the virtualization layer 116 may utilize physical hardware resources of the compute layer 110, storage layer 112, and/or network layer 114 to support operation of one or more components of the virtualization layer 116. Additionally or alternatively, in some example embodiments, the virtualization layer 116 may include dedicated physical resources (e.g., physical hardware components) that may provide computing, storage, and/or network communication resources to one or more components of the virtualization layer 116.

It will be appreciated that the compute layer 110, storage layer 112, network layer 114, and virtualization layer 116 as illustrated in FIG. 1 and described above are provided by way of example, and not by way of limitation. In this regard, in some embodiments, aspects of the compute layer 110, storage layer 112, network layer 114, and virtualization layer 116 as described above may not be mandatory and thus some may be omitted in certain embodiments. Additionally, the converged infrastructure 102 of some embodiments may include further or different layers and/or components beyond those illustrated in and described with respect to FIG. 1. A block diagram of an example converged infrastructure architecture that may be implemented by the converged infrastructure 102 of some example embodiments is illustrated in and described below with respect to FIG. 2.

Physical components of the converged infrastructure 102 may be communicatively coupled with each other to support operation of the converged infrastructure 102 via direct connection and/or network communication. For example, as discussed above, in some example embodiments, the network layer 114 may provide switching and routing between physical components of the converged infrastructure.

In some embodiments at least a portion of the components of the converged infrastructure 102 may be assigned addresses, such as Internet Protocol (IP) addresses and/or other network layer addresses, via which the components may be accessed by another component internal to the converged infrastructure 102 and/or via a computing device external to the converged infrastructure 102. For example, in some example embodiments, the converged infrastructure 102 and/or one or more network addressable components thereof may be accessed by an external computing device over a network to which the converged infrastructure 102 of some embodiments may be connected.

FIG. 2 illustrates a block diagram of an architecture of another example converged infrastructure 202 in accordance with some example embodiments. The converged infrastructure 202 may, for example, be an embodiment of the converged infrastructure 102 in accordance with some example embodiments. It will be appreciated that the components and associated architecture illustrated in and described with respect to FIG. 2 are provided by way of example, and not by way of limitation. In this regard, components illustrated in FIG. 2 and described further below may not be mandatory and thus some may be omitted in certain embodiments. Additionally, some embodiments may include further or different components, beyond those illustrated in and described with respect to FIG. 2. Further, it will be appreciated that converged infrastructures within the scope of the disclosure may implement architectures other than that illustrated in and described with respect to FIG. 2. Some example embodiments provide for the generation of a power cabling plan for connecting power drawing components of the of the converged infrastructure 202 to PDUs that may be used to supply power for the power drawing components.

The converged infrastructure 202 may include a physical infrastructure 210 configured to support a virtualized infrastructure 220. In some example embodiments, the physical infrastructure 210 may include hardware resources 214, such as servers 216-1 to 216-N (sometimes referred to as "hosts") and one or more storage array networks (SAN), such as SAN 218, which may be communicatively connected by a network (not shown). The physical infrastructure 210, including hardware resources 214 may, for example, provide an embodiment of the compute layer 110, storage layer 112, and network layer 114. For example, the servers 216 may comprise an implementation of the compute layer 110, and the SAN 218 may comprise an implementation of the storage layer 112. The hardware resources 214, including, for example, the servers 216 and SAN 218 may be communicatively connected by an embodiment of the network layer 114.

In some example embodiments, the physical infrastructure 210 may be organized into a "computing-block" based infrastructure, wherein physical infrastructure units may be characterized by repeatable units of construction having similar performance, operational characteristics, and discrete requirements of power, space, and cooling that facilitate rapid deployment, integration, and scalability. The computing-block based infrastructure may be configured to dynamically provision hardware resources based on performance demands placed on the physical infrastructure 210. One such example of physical infrastructure 210 is a Vblock System available from the VCE Company, LLC.

The physical infrastructure 210 may further include an infrastructure manager 212 configured to manage the configuration, provisioning, and policy compliance of the physical infrastructure 210. Infrastructure manager 212 may be configured to provide an interface by which provisioning of hardware resources 214 (e.g., computing, networking, storage) may be managed with policy-based automation. According to some embodiments, the infrastructure manager 212 may be included in every physical infrastructure 210 to manage the configuration, provisioning, and compliance of computing-block based infrastructure. As described in further detail below, the virtualized infrastructure 220 (or component thereof) of some example embodiments may be configured to connect to and communicate with the infrastructure manager 212 to manage and/or configure the physical infrastructure 210 to support operation of components of the virtualized infrastructure 220. One example of an infrastructure manager 212 includes EMC Ionix Unified Infrastructure Manager (VIM) available from EMC Corporation. In some embodiments, the infrastructure manager 212 may further be configured to provide network manager functionality such that the infrastructure manager 212 may be configured to configure network devices (e.g., switches, routers) and manage addressing, subnets, virtual local area networks (VLANs), and/or other network configurations that may be implemented on the converged infrastructure 202. One example of a network manager that may be included on the infrastructure manager 212 of such embodiments is a Cisco Switch, such as may be accessible via a Cisco IOS® command line interface (CLI), available from Cisco System, Inc.

The virtualized infrastructure 220 may include a virtualization environment 222 comprising one or more virtual machines (VM) 240, such as VM 240-1 to VM 240-M. Each virtual machine 240 can have an operating system (OS), one or more applications (APP) and an agent (AGENT). In some embodiments, one or more of the virtual machines 240 may be configured to connect to one or more users by a communications network, such as the Internet. The virtualized infrastructure 220 may, for example, comprise an embodiment of at least a portion of the virtualization layer 116.

The virtualization environment 222 may accordingly be configured to simulate (e.g., to virtualize) conventional components of a computing device, such as a processor, system memory, a hard disk drive, and/or the like for executing the VMs 240. For example, each VM 240 may include a virtual processor and a virtual system memory configured to execute an application. Thus, for example, the converged infrastructure 202 of some example embodiments may be configured to perform physical-to-virtual conversion of hardware resources 214 and/or other physical computing of the physical infrastructure 210 to support or host virtual machines 240 in the virtualized infrastructure 220. In this regard, components of the physical infrastructure 210 may include physical components, such as physical servers and/or other computing devices, memories, buses, networks, and/or other physical components, which may collectively support the virtualized infrastructure 220 and VMs 240.

A virtualization manager 224 of the virtualization environment 222 may be configured to establish and oversee the VMs 240. The virtualization manager 224 may be configured to dynamically allocate resources among the virtual machines 240. For example, in some embodiments, the virtualization manger 224 may be configured to communicate with the infrastructure manager 212 to manage and/or configure the physical infrastructure 210 to support operation of the virtual machines 240. The virtualization manager 224 of some example embodiments may be implemented with the VMware® vCenter® virtualized management platform available from VMware, Inc., of Palo Alto, Calif.

In some example embodiments, virtualization environment 222 may be implemented by running VMware vSphere® and/or VMware ESX®-based hypervisor technologies, available from VMware, Inc., on servers 216. However, it will be appreciated that any virtualization/hypervisor technology may be used in addition to or in lieu of VMware hypervisor technologies in accordance with various example embodiments.

Some example embodiments described further herein below may provide for generation of a power cabling plan for a converged infrastructure, such as converged infrastructure 102 and/or converged infrastructure 202. In this regard, some example embodiments may be configured to assign each of a plurality of power drawing components, such as compute layer (e.g., compute layer 110) components, storage layer (e.g., storage layer 112) components, and network layer (e.g., network layer 114) components, to one or more PDU ports that may supply power to the power drawing components to support operation of a converged infrastructure.

FIG. 3 illustrates a block diagram of an example computing system 300 that may be configured to generate a power cabling plan in accordance with some example embodiments. The computing system 300 may be implemented on any computing device or plurality of computing devices that may be configured to implement one or more example embodiments. By way of non-limiting example, in some embodiments, the computing system 300 may be implemented on a personal computer (e.g., a desktop computer, laptop computer, or the like), a mobile computing device (e.g., a smart phone, tablet computer, personal digital assistant, or the like), on a server(s) that can be accessed over a network by another computing device, some combination thereof, or the like.

The computing system 300 may include a plurality of elements, such as cabling plan module 304, processing circuitry 310, mass storage 318, communication interface 320, and user interface 322, which may be interfaced, such as via a system bus 316. It will be appreciated that the components, devices or elements illustrated in and described with respect to FIG. 3 below may not be mandatory and thus some may be omitted in certain embodiments. Additionally, the computing system 300 of some embodiments may include further or different components, devices or elements beyond those illustrated in and described with respect to FIG. 3.

Further, while FIG. 3 illustrates an architecture including elements interfaced via the system bus 316, it will be appreciated that in some example embodiments, elements of the computing system 300 may be implemented in a distributed computing environment in which elements may be distributed across a plurality of computing devices, which may be in communication with each other, such as via a network, to provide functionality of the computing system 300. As such, in some example embodiments, a subset of the elements of the computing system 300 may be communicatively coupled via a network in addition to or in lieu of the system bus 316.

The computing system 300 of some example embodiments may implement an operating system(s), such as MS-WINDOWS™, MACINTOSH OS X™, UNIX™, LINUX™ IBM z/OS™, CISCO™ INTERNETWORK OPERATING SYSTEM™ (IOS), CISCO™ CATALYST™ OPERATING SYSTEM (CatOS), CISCO NX-OS, EMC™ ISILON OneFS™ OPERATING SYSTEM, NETAPP™ DATA ONTAP™, GOOGLE ANDROID™, APPLE IOS™, or other known operating systems. It should be appreciated, however, that in some embodiments, one or more aspects of the computing system 300 may be implemented on and/or integrated with a virtualized computing system, such as may be provided by a converged infrastructure (e.g., the converged infrastructure 102 and/or converged infrastructure 202).

In some example embodiments, the computing system 300 may include processing circuitry 310 that is configurable to perform actions in accordance with one or more example embodiments disclosed herein. In this regard, the processing circuitry 310 may be configured to perform and/or control performance of one or more functionalities for generating a power cabling plan in accordance with various example embodiments. Thus, the processing circuitry 310 may be configured to perform data processing, application execution and/or other processing and management services according to one or more example embodiments.

In some example embodiments, the processing circuitry 310 may include a processor 312 and, in some embodiments, such as that illustrated in FIG. 3, may further include memory 314. The processing circuitry 310 may be in communication with (e.g., via system bus 316) and/or otherwise control the cabling plan module 304, mass storage 318, communication interface 320, and/or user interface 322.

The processor 312 may be embodied in a variety of forms. For example, the processor 312 may be embodied as various hardware processing means such as a microprocessor, a coprocessor, a general purpose processor, a controller or various other computing or processing devices including integrated circuits (e.g., a logic device), such as an ASIC (application specific integrated circuit), an FPGA (field programmable gate array), some combination thereof, or the like. Although illustrated as a single processor, it will be appreciated that the processor 312 may comprise a plurality of processors. The plurality of processors may be in operative communication with each other and may be collectively configured to perform one or more functionalities to support generation of a power cabling plan in accordance with various embodiments. In some embodiments in which the computing system 300 is embodied as a plurality of computing devices, a plurality of processors, which may collectively form the processor 312, may be distributed across a plurality of computing devices that may be in operative communication with each other directly and/or via a network. In some example embodiments, the processor 312 may be configured to execute instructions that may be stored in a memory, such as the memory 314 and/or the mass storage 318 and/or that may be otherwise accessible to the processor 312. As such, whether configured by hardware or by a combination of hardware and software, the processor 312 may be capable of performing operations according to various embodiments while configured accordingly.

In embodiments including the memory 314, the memory 314 may include read only memory (ROM), random access memory (RAM), and/or the like. The mass storage 318 may include one or more memory and/or other storage devices, which may include fixed (e.g., a fixed hard disc drive, storage array, fixed flash memory device, and/or the like) and/or removable memory devices (e.g., a floppy disc drive, a removable flash memory device, an optical disc drive, and/or other removable memory device). The mass storage 318 may provide a persistent data storage device. In some example embodiments, the mass storage 318 may be configured to provide a backup storage. The mass storage 318 may include a memory device implemented locally to the computing system 300 and/or a memory device remote to the computing system 300, which may be communicatively coupled with the computing system 300, such as via a network. In some embodiments in which the computing system 300 is embodied as a plurality of computing devices, the memory 314 and/or mass storage 318 may include a plurality of memory devices, which may be distributed across a plurality of computing devices that may be in operative communication with each other directly and/or via a network to form the computing system 300.

In some embodiments, the memory 314 and/or the mass storage 318 may provide a non-transitory computer-readable storage medium that may store computer program instructions that may be executed by the processor 312. In this regard, the memory 314 and/or mass storage 318 may be configured to store information, data, applications, instructions and/or the like for enabling the computing system 300 to carry out various functions in accordance with one or more example embodiments. Applications that may be executed by the processor 312 may also be in the form of modulated electronic signals that may be accessed via a network modem or other network interface of the computing system 300.

The computing system 300 may further include a communication interface 320. The communication interface 320 may enable the computing system 300 to communicate (e.g., over a network or other communication interface) with another computing device or system. In this regard, the communication interface 320 may include one or more interface mechanisms for enabling communication with other devices and/or networks. As such, the communication interface 320 may include, for example, an antenna (or multiple antennas) and supporting hardware and/or software for enabling communications with a wireless communication network (e.g., a cellular network, wireless local area network, and/or the like) and/or a communication modem or other hardware/software for supporting communication via cable, digital subscriber line (DSL), USB, FireWire, Ethernet, one or more optical transmission technologies, and/or other wireline networking methods.

In some example embodiments, the computing system 300 may include the user interface 322. It will be appreciated, however, that in some example embodiments, one or more aspects of the user interface 322 may be omitted, and in some embodiments, the user interface 322 may be omitted entirely. The user interface 322 may be in communication with the processing circuitry 310 to receive an indication of a user input and/or to provide an audible, visual, mechanical, or other output to a user. As such, the user interface 322 may include, for example, a keyboard, a mouse, a joystick, a display, a touch screen display, a microphone, a speaker, one or more biometric input devices, and/or other input/output mechanisms.

In some embodiments including the user interface 322, the user interface 322 may be provided entirely by the computing system 300. Alternatively, in some example embodiments, aspects of the user interface 322 may be implemented by a computing device that may be in communication with the computing system 300. For example, in some embodiments in which the computing system 300 includes a server(s) providing software, a virtualized computing environment, and/or the like that can be accessed by another computing device (e.g., a mobile computing device, personal computing device, and/or the like) over a network, input/output interface mechanisms that may be used by a user to support generation of a power cabling plan in accordance with various embodiments may be provided by the computing device used to access the computing system 300.

The computing system 300 may further include the cabling plan module 304. The cabling plan module 304 may be embodied as various means, such as circuitry, hardware, a computer program product comprising a computer readable medium (for example, the memory 314 and/or mass storage 318) storing computer readable program instructions executable by a processing device (for example, the processor 312), or some combination thereof. In some embodiments, the processor 312 (or the processing circuitry 310) may include, or otherwise control the cabling plan module 304. For example, in some embodiments, the processor 312 may be configured to perform functionality of the cabling plan module 304 (through execution of instructions that may be stored on and/or otherwise loaded onto the memory 314 and/or the mass storage 318.

Power drawing components of computing systems, such as the converged infrastructure 102 and/or converged infrastructure 202, in accordance with various embodiments may be connected via power cables to PDUs that may supply power to support operation of the power drawing components. A power drawing component may include any physical component of a computing system that may be connected to a PDU that may supply power to support operation of the power drawing component. By way of non-limiting example, power drawing components may include various compute components, network components, storage components, and/or the like that may be included in a computing system, such as a converged infrastructure as described above. Power drawing components and/or PDUs may each include one or more ports to support connection of a power cable that may be used to connect a power drawing component to a PDU. A port may be configured to mate or couple with an end of a cable, such as by various male-female coupling configurations. A cable may accordingly be used to connect a power drawing component to a PDU by connecting a port implemented on a power drawing component to a port implemented on a PDU (e.g., a PDU port). The cabling plan module 304 of some example embodiments may be configured to assign each of a plurality of power drawing components that may be included in a computing system to one or more PDU ports and may generate a power cabling plan defining the assigned PDU port(s) for each power drawing component.

Any of a variety of PDUs, also sometimes referred to as Power Output Units (POUs), may be used in accordance with various embodiments. Each PDU may include one or more discrete power circuits. Typically, depending on type, an individual PDU may include either three circuits or six circuits. Each circuit of a PDU may have one or more PDU ports that may be used to connect power drawing components and supply power to power drawing components assigned to the circuit. In some system builds, one or more PDUs may be mounted vertically within a rack, such that PDU ports may be distributed vertically from the top to bottom of a rack in a layout that may vary dependent on the type (e.g., model) of PDU. Additionally or alternatively, in some system builds, one or more PDUs may be horizontally mounted in one or more mount positions in a rack.

Power drawing components that may be assigned to a PDU port(s) in accordance with various example embodiments and the PDUs supplying power to the power drawing components may be mounted in a rack. A rack that may be used to house components of a computing system can be any rack, such as a closed cabinet rack (e.g., a rack enclosure or cabinet), an open frame rack, or other structure comprising a plurality of mount positions (e.g., slots, mounts, and/or mechanism that can be used to support a power drawing component in a mount position on a rack). Each mount position may have a uniform vertical dimension. For example, in some embodiments, a mount position may be defined as a rack unit (RU) of space, which may, for example, have a vertical height of 1.75 inches (44.45 millimeters). It will be appreciated, however, that other dimensions that may be used for mount positions within a rack are contemplated within the scope of the disclosure.

A power drawing component may be mounted in a mount position of a rack. An elevation plan, such as that illustrated in and described below with respect to FIG. 4, may specify a mount position in which a power drawing component is to be mounted. In some system builds in which one or more PDUs are horizontally mounted within one or more mount positions, the mount position(s) of the horizontally mounted PDU(s) may also be specified by the elevation plan. A vertical dimension of a component may require one or more mount positions (e.g., rack units) of space within a rack such that a power drawing component defined to be mounted in a given mount position may occupy multiple mount positions within a rack. The elevation plan may accordingly indicate the mount position(s) within a rack that are occupied by a given power drawing component.

A rack that may be used to house power drawing components, PDUs, and/or other components of a computing system may have any of a variety of sizes. By way of non-limiting example, racks having 42 mount positions (e.g., 42 RUs of vertical racking space) may be used in some example embodiments. However, it will be appreciated that racks having other dimensions are contemplated within the scope of the disclosure and examples described herein with respect to racks having 42 mount positions are provided by way of example and not by way of limitation.

The cabling plan module 304 may be configured to generate a power cabling plan based at least in part on a build plan for a rack that may identify a plurality of power drawing components and one or more PDUs that are or will be housed in the rack in accordance with a design specification for a computing system. In this regard, the build plan may identify the specific types and quantity of both power drawing components and PDUs that may be included in a rack(s) housing components of a computing system.

In some example embodiments, the build plan for a rack may be at least partially specified by an elevation plan defining the vertical arrangement of power drawing components within a rack. FIG. 4 illustrates an example elevation plan that may be used to facilitate generation of a power cabling plan in accordance with some example embodiments. The elevation plan in the example of FIG. 4 is for a computing system including at least two racks, including rack 1 (402) and rack 2 (404). In accordance with some example embodiments, power cables may not be used to connect a power drawing component in a first rack to a PDU in a second rack. In this regard, power drawing components mounted in a rack may be powered by one or more PDUs mounted in the same rack. As such, the cabling plan module 304 of some example embodiments may be configured to perform power balancing and generation of a power cabling plan for a computing system on a rack-by-rack basis, such that power balancing and assignment of power drawing components to PDU ports may be performed separately for the rack 1 (402) and rack 2 (404).

Each of rack 1 (402) and rack 2 (404) is illustrated by way of example as a 42 RU rack, with respective rack units in each rack numbered RU1-RU42. Mount positions (e.g., RUs) in which a component is mounted include an indication of the component identity. A logical identifier of the component, such as A, B, C, etc. may also be included in the elevation plan. If a component occupies multiple mount positions in the rack, the mount positions occupied by the component may be grouped into a single cell. In the example of FIG. 4, open mount positions that are not used for mounting a component are designated by shading.

It will be appreciated that the example elevation plan of FIG. 4 is provided by way of illustrative example, and not by way of limitation as to the format of an elevation plan that may be used by the cabling plan module 304. In this regard, the elevation plan that may be used by the cabling plan module 304 may take the form of a table or spreadsheet, such as illustrated in FIG. 4, a text-based list defining associations between components and their respective mount positions, a database, and/or other format that may be used to define mount positions for components within a computing system.

It will be appreciated that an elevation plan is provided as one example format of a build plan that may be used by the cabling plan module 304 to facilitate generation of a power cabling plan in accordance with some example embodiments. In this regard, other alternative formats may be used in addition to or in lieu of an elevation plan to provide a build plan for a rack that may be used by the cabling plan module 304 in accordance with various embodiments.

An elevation plan, such as that illustrated in FIG. 4, and/or other build plan or portion thereof that may be used to facilitate generation of a power cabling plan may, for example, be specified, uploaded, and/or defined by a user via a user interface that may be provided by a software tool that may be provided in accordance with some example embodiments. Additionally or alternatively, in some example embodiments, an elevation plan and/or other build plan or portion thereof may be generated based on a build specification defining components to be included in the computing system as a prelude to generating the power cabling plan as part of a system design process.

The cabling plan module 304 may accordingly determine a plurality of power drawing components and one or more PDUs that are or will be housed in the rack from a build plan. The cabling plan module 304 may further have access to component specification information, such as may be stored in memory 314 and/or mass storage 318 and/or that may otherwise be locally accessed and/or remotely accessed (e.g., via a network) by the computing system 300. The component specification information may, for example, define an amount of power drawn (e.g., a maximum power that can be drawn, an average power drawn, and/or other power draw characteristic) for each of a plurality of types of power drawing components. The component specification information may specify the amount of power drawn by a power drawing component in terms of a power measurement (e.g., in watts), in terms of an amount of current drawn by the component (e.g., in amps), and/or other measurement that may be representative of a power load of a component. Accordingly, given a build plan defining the power drawing components housed in a rack, the cabling plan module 304 may be configured to use the component specification information to determine the amount of power drawn by each power drawing component.

The component specification information may further define the number of power connections used by one or more power drawing component. In this regard, some power drawing components may use multiple power connections to fully power the component. Additionally or alternatively, some power drawing components may utilize a redundant set(s) of two power connections such that if a primary power source (e.g., a first PDU) to which a first power connection may be connected fails, a backup power source (e.g., a second PDU) to which a second power connection may be connected may be used to power the component.

The component specification information may further include PDU specification information, such as may define the number of circuits implemented on a PDU, the number of PDU ports associated with each circuit, the port layout information (e.g., the quantity and location of PDU ports on the PDU), and/or the like. The PDU specification information may further define power and/or amperage specifications for a PDU, such as a maximum amperage draw that a PDU and/or circuit thereof may provide, a maximum power load that a PDU and/or circuit thereof may support, and/or the like. As a further example, PDU specification information may define whether a given PDU type is a single phase PDU or a three phase PDU. Accordingly, given a type of PDU housed in a rack that may be indicated by a build plan, the cabling plan module 304 may determine PDU specification information for the PDU type, and may use this specification information to facilitate generation of a power cabling plan as described further herein below.

The cabling plan module 304 may be configured to use information that may be determined from the build plan for a rack and/or from component specification information as inputs to determine a power cabling plan for a rack. For example, the cabling plan module 304 may consider some combination of one or more of the types and quantities thereof of power drawing components housed in a rack, the layout (e.g., mount positions that may be specified in an elevation plan) of power drawing components within the rack, the type(s) and quantity of PDUs housed in the rack, the amount of power drawn by each power drawing component, the number of power connections used by each power drawing component, the port layout of each PDU, and/or the like as inputs to an algorithm that the cabling plan module 304 may use to assign each power drawing component to one or more PDU circuits and generate a power cabling plan in accordance with various example embodiments In accordance with some example embodiments, the cabling plan module 304 may be configured to assign each power drawing component to one or more circuits to facilitate generation of a power cabling plan via a two phase process that may be used to distribute power loads across PDU circuits in a relatively balanced manner. The first phase may comprise an initial iterative assignment of each power drawing component to one or more circuits that may provide a rough balancing of power loads across circuits. The second phase may include reassigning one or more power drawing components to reduce imbalances in power loads between pairs of circuits that may result from the initial iterative assignment.

In first phase, each power drawing component may be iteratively read from the build plan (e.g., one at a time) and may be assigned to one or more circuits. The number of circuits to which a power drawing component may be assigned may correspond to the number of power connections used by the component. When assigning a power drawing component to a circuit during the first phase, the cabling plan module 304 may be configured to assign a power drawing component to the circuit with the lowest assigned power load among all available circuits. If two or more circuits have the lowest assigned power load (e.g., two or more circuits have equally low power loads) and one of the circuits having the lowest assigned power load is implemented on a PDU having fewer assigned connections than the PDU(s) on which the other circuit(s) having the lowest assigned power load is implemented, the power drawing component may be assigned to the circuit implemented on the PDU having fewer assigned connections.

As an example in which a power drawing component may be assigned to one of three circuits (e.g., circuit 1, circuit 2, or circuit 3), the first three power drawing components will be assigned to circuit 1, circuit 2, and circuit 3, respectively. Assume that the amount of power drawn by the first component is 12 amps, the amount of power drawn by the second component is 12 amps, and the amount of power drawn by the third component is 5 amps. Accordingly, after assignment of the first three power drawing components, the load on circuit 1 may be 12 amps, the load on circuit 2 may be 12 amps, and the load on circuit 3 may be 5 amps. As circuit 3 has the lowest assigned power load, the fourth power drawing component may be assigned to circuit 3. If the amount of power drawn by the fourth power drawing component is less than 7 amps, such that the load on circuit 3 after assignment of the fourth power drawing component is less than 12 amps, the fifth power drawing component may be assigned to circuit 3 as well. Accordingly, the first phase may provide iterative assignment of power drawing components to a circuit with some preliminary load balancing across circuits.

Iterative assignment of power drawing components may be performed in any of a variety of orders. By way of non-limiting example, in some example embodiments, power drawing components may be assigned to a circuit(s) in an order corresponding to a vertical arrangement of components within a rack, such as may be specified in an elevation plan. In this regard, in such embodiments, power drawing components in a rack may be iteratively assigned to a circuit(s) in order of their mount positions in the rack from top-to-bottom and/or from bottom-to top.

Power drawing components that have been assigned to a circuit may be assigned to PDU ports corresponding to the circuit in any order. In some embodiments, PDU ports of a given circuit may be identified by reference number (e.g., 1, 2, 3 . . . ) such that a port may be an even numbered port or an odd numbered port. In some example embodiments, when a power drawing component is assigned to a circuit, the power drawing component may be assigned to the next (e.g., the lowest numbered) available odd numbered port until all odd numbered ports of the circuit have been allocated. After all odd numbered ports of a circuit have been allocated in such embodiments, any further power drawing components assigned to the circuit may be assigned to the next available even numbered ports (e.g., in order from the lowest even numbered port to the highest even numbered port).

Following iterative assignment of each power drawing component to at least one circuit, the cabling plan module 304 may attempt to reduce any imbalances in power loads between pairs of circuits by reassigning one or more power drawing components between circuits. In this regard, the cabling plan module 304 may determine a difference (e.g., a delta) in assigned power loads for each pair of circuits. For example, if power loads have been distributed among three circuits (e.g., circuit 1, circuit 2, and circuit 3), the cabling plan module 304 may determine the difference in assigned power loads for the pair of circuits including circuits 1 and 2, the pair of circuits including circuits 2 and 3, and the pair of circuits including circuits 1 and 3.

The cabling plan module 304 may determine if a difference in assigned power loads for any of the circuit pairs is reducible by reassigning at least one power drawing component between circuits in the circuit pair. Reassignment of a power drawing component may, for example, include swapping two components such that one component is reassigned from a first circuit to a second circuit and another component is reassigned from the second circuit to the first circuit. As another example, reassignment of a power drawing component may include moving a component to another circuit without a reciprocal move of another component, such that a component may be reassigned from a first circuit to a second circuit without any component being reassigned from the second circuit to the first circuit.

In some example embodiments, the cabling plan module 304 may order the circuit pairs by their respective differences in assigned power loads from highest to lowest. The cabling plan module 304 may then check the circuit pairs in order from the highest to the lowest difference in assigned power loads to determine if the difference in assigned power loads for a circuit pair may be reduced by reassigning one or more power drawing components between circuits in the circuit pair. If the cabling plan module 304 determines that a difference in assigned power loads for a circuit pair may be reduced, the cabling plan module 304 may reassign a power drawing component(s) between circuits in the circuit pair. The cabling plan module 304 may then recalculate the difference in assigned power loads for each circuit pair and repeat the process until the difference in assigned power loads cannot be reduced for any circuit pair. In this regard, the process may be repeated until either (1) all of the differences in assigned power loads equal 0 such that the power load is equally distributed across all circuits; or (2) it is not possible to further reduce the difference in assigned power loads for any circuit pair.

In some example embodiments, PDUs may be grouped into pairs providing redundant power. Thus, for example, for a power drawing components using a redundant set of power connections for connection to both a primary power source and a backup power source, the first (e.g., primary) power connection may be assigned to a first (e.g., primary) PDU in a PDU pair and the second (e.g., backup) power connection may be assigned to a second (e.g., backup) PDU in the PDU pair. In some such example embodiments, the cabling plan module 304 may be configured to use the two phase assignment process described above to balance power loads across circuits in the primary PDU(s) and may then mirror assignments made to circuits in the primary PDU(s) to the corresponding circuits of the backup PDU(s).

In some example embodiments, a power cabling plan that may be generated by the cabling plan module 304 may define a type of power cable to use for a connection between a power drawing component and PDU port to which the power drawing component is assigned. In this regard, different types of power drawing components and/or different types of PDUs may use different types of power cables. For example, a power port on a power drawing component and/or a PDU port may have an associated power cable type that may be used for connections to the port. As another example, different types of power cables may be used depending on an amount of power drawn by a component. The cabling plan module 303 may accordingly be configured to determine the type of power cable to use for a connection, such as based on a type of power port implemented on the power drawing component, a type of the PDU port to which the power drawing component has been assigned, an amount of power drawn by the power drawing component, and/or other factors that may be used to select an appropriate power cable type. It will be appreciated that any of a variety of power cable types may be used to connect a power drawing component to a PDU in accordance with various example embodiments. By way of non-limiting example, C13/C14, C19/C20, and/or other such power cable types may be used in accordance with various example embodiments.

A power cabling plan that may be generated by the cabling plan module 304 in accordance with various example embodiments may additionally or alternatively specify a cable length to use for a connection between a power drawing component and an assigned PDU port The cabling plan module 304 may be configured to determine the cable length to use to connect the pair of ports in a port pair based at least in part on an elevation plan, such as that illustrated in and described with respect to FIG. 4. In this regard, the elevation plan may define the mount position for a power drawing component. In some system builds in which a PDU(s) may be horizontally mounted, the elevation plan may further define the mount position(s) for a PDU(s). Hence given the mount position of the power drawing component (and in some embodiments the mount position of a PDU) and knowledge of the port layout of a PDU that may be determined from component specification information as described above, the cabling plan module 304 of some example embodiments may be configured to calculate a length of cable that may be needed to connect the power drawing component to the assigned PDU port.

For example, the cabling plan module 304 may determine a vertical distance from a mount position of a power drawing component to a location of the PDU port to which the power drawing component may be assigned. The cabling plan module 304 may additionally or alternatively determine one or more horizontal distances that a power cable connecting the power drawing component to the PDU port may travel. For example, a power cable may be routed horizontally within a rack unit of space from a power port of the power drawing component to a vertical routing position at which the power cable may be routed vertically from the rack unit toward the assigned PDU port. The vertical routing position may, for example, be a side of a rack down which cables may be routed, a dedicated cable channel that may be included in a rack for vertically routing cables within the rack, and/or other structure that may be used to route cables within a rack. A power cable may be additionally or alternatively routed horizontally within a rack unit to the assigned PDU port from a vertical routing position to which the power cable may be vertically routed from the mount position of the power drawing component.

In some example embodiments, the cabling plan module 304 may be configured to determine a minimum power cable length needed to connect a power drawing component to the assigned PDU port (e.g., based on a mount position of the power drawing component and a location of the PDU port). In some example embodiments, there may be a plurality of predefined available lengths of power cables. The cabling plan module 304 may accordingly be configured to determine a shortest available cable length satisfying the minimum cable length, and may include an indication of the shortest available cable length satisfying the minimum cable length in the power cabling plan. For example, if power cables are available in 3 foot and 5 foot lengths and the minimum cable length needed for a connection is 4 feet, the cabling plan module 304 may determine that the 5 foot power cable is needed for the connection and may include an indication in the power cabling plan that the 5 foot power cable should be used for the connection.

In some example embodiments, the cabling plan module 304 may be configured to verify based on a minimum power cable length needed to connect a power drawing component to the assigned PDU port that an available power cable length is sufficient to connect the power drawing component to the assigned PDU report. If there is not a sufficiently long power cable available, the cabling plan module 304 may be configured to reassign the power drawing component to another PDU port on the same circuit or on a different circuit that may be positioned closer to the power drawing component.

The power cabling plan that may be generated by the cabling plan module 304 may be specified in any format. For example, the power cabling plan may comprise a table, list, and/or other structure that may identify each an assigned PDU port(s) for each of a plurality of power drawing components. The power cabling plan may further indicate a power port on a power drawing component that should be used to connect the power drawing component to an assigned PDU port. Thus, for example, an individual building a computing system may reference the power cabling plan and determine, for a given power drawing component, the PDU port(s) that should be used to connect the power drawing component. A non-limiting example of a cabling plan that may be generated in accordance with some example embodiments is illustrated in and described below with respect to FIG. 8.

In some example embodiments, the cabling plan module 304 may be configured to generate an electronic output file specifying the power cabling plan. In this regard, a power cabling plan, such as that illustrated in and described below with respect to FIG. 8, may be specified in an electronic file format, such as spreadsheet format (e.g., .xls or the like), a document format (e.g., .doc or the like), a database file, and/or the like. In such example embodiments, the electronic output file including the power cabling plan may be stored in a memory, such as memory 314, mass storage 318, and/or the like. In some embodiments, the electronic output file that may include the power cabling plan may be readable by and/or exportable to a software program, such as to support further system design tasks, system build tasks, and/or system diagnostic/repair tasks for a completed system.

In some example embodiments, the cabling plan module 304 may be configured to generate a graphical user interface including the power cable plan, which may be displayed to a user. For example, the power cabling plan may be displayed on a display that may be provided by the user interface 322.

In some example embodiments, generation of the power cabling plan may further include the cabling plan module 304 generating a set of cable labels. In such embodiments, the cable labels may be printed and used to label power connections (e.g., with information indicative of a power drawing component and/or PDU port connected by a power cable) when cabling a computing system in accordance with the power cabling plan.

In some example embodiments, the cabling plan module 304 may be configured to verify that the assigned line load for a PDU does not exceed a maximum allowable power load for the PDU. The maximum allowable power load for a PDU may be specified in PDU specification information that may be accessed by the cabling plan module 304 as described above. Thus, for example, for a single phase PDU, the cabling plan module 304 may determine that the assigned line load for the PDU does not exceed the maximum allowable power load for the PDU. As a further example, the cabling plan module 304 may be configured to determine for a three phase PDU whether the assigned line load for each phase exceeds the maximum allowable power load for the phase. If an assigned line load exceeds a maximum allowable power load for a PDU, the cabling plan module 304 may be configured to generate an error message in lieu of generating a power cabling plan. In this regard, the cabling plan module 304 may be configured to not generate a power cabling plan if an assigned line load is such that system failure may occur due to overloading of a PDU.

FIG. 5 illustrates a flowchart according to an example method for generating a power cabling plan for a computing system in accordance with some example embodiments. One or more elements of the computing system 300, such as the cabling plan module 304, processing circuitry 310, processor 312, memory 314, system bus 316, mass storage 318, communication interface 320, and/or the user interface 322 may, for example, provide means for performing one or more of the operations illustrated in and described with respect to FIG. 5 in accordance with some example embodiments.

Operation 500 may include accessing a build plan for a rack housing at least a portion of the computing system. The build plan may identify a plurality of power drawing components and a plurality of PDUs housed that may be housed in the rack in accordance with the build plan. In some example embodiments, the build plan may comprise an elevation plan.

Operation 510 may include iteratively assigning each of the plurality of power drawing components to at least one circuit based at least in part on an existing power load assigned to each circuit and an amount of power drawn by the component. An example method that may be used to perform operation 510 is illustrated in and described below with respect to FIG. 6.

Operation 520 may include reassigning at least one power drawing component between circuits in a circuit pair if a difference in assigned power loads between circuits in any circuit pair is reducible. An example method that may be used to perform operation 520 is illustrated in and described below with respect to FIG. 7.

Operation 530 may include generating a power cabling plan defining at least one assigned PDU port for each of the plurality of power drawing components. Each assigned PDU port may correspond to a circuit to which the power drawing component has been assigned based at least in part on operation 510 and/or on operation 520. The power cabling plan may further indicate a cable type and/or a cable length to use for one or more connections.

In some example embodiments, the PDUs may be grouped into one or more PDU pairs including a first PDU and a second PDU. Operations 510 and 520 may be used to assign primary power connections to the first PDU(s) in the PDU pair(s). The assignments may then be mirrored to the second PDU(s) in the PDU pair(s). The power cabling plan may include these mirrored assignments.

In some example embodiments, performance of the method of FIG. 5 may be triggered in response to a user command. For example, a user may provide a build plan and/or other input (e.g., via user interface 322) and the cabling plan module 304 may be configured to generate a power cabling plan based at least in part on this input. For example, in some embodiments, a graphical user interface, such as may be part of a software suite for designing computing systems, may be used to initiate generation of a power cabling plan. Additionally or alternatively, in some example embodiments, a command line interface may be used to initiate generation of a power cabling plan.

FIG. 6 illustrates a flowchart according to an example method for performing an initial iterative assignment of power drawing components to a circuit in accordance with some example embodiments. In this regard, FIG. 6 illustrates an example method that may be used to facilitate performance of operation 510 as described above. One or more elements of the computing system 300, such as the cabling plan module 304, processing circuitry 310, processor 312, memory 314, system bus 316, mass storage 318, communication interface 320, and/or the user interface 322 may, for example, provide means for performing one or more of the operations illustrated in and described with respect to FIG. 6 in accordance with some example embodiments.

Operation 600 may include determining the next power drawing component to be assigned to a circuit. For example, in some embodiments, power drawing components may be iteratively assigned in an order corresponding to their vertical arrangement within a rack. Thus, the first time that operation 600 is performed for a rack may include determining the first power drawing component to be assigned, which may be the top-most power drawing component if components are assigned from top-to-bottom or the bottom-most power drawing component if components are assigned from bottom-to-top. On subsequent performances of operation 600, operation 600 may include determining the power drawing component in the next occupied mount position from the previously assigned power drawing component.

Operation 610 may include determining the circuit(s) having the lowest assigned power load of the available circuits. Operation 620 may include assigning the power drawing component (e.g., the component determined in operation 600) to a circuit having the lowest assigned power load. If multiple circuits are determined to have the lowest assigned power load and the circuits are on different PDUs, the power drawing component may be assigned to the circuit implemented on the PDU having the fewest assigned connections. Operation 630 may include incrementing the power load assigned to the circuit to which the power drawing component is assigned by an amount of power drawn by the component.

Operation 640 may include determining if the last power drawing component has been assigned. If there are still one or more power drawing components to be assigned, the method may return to operation 600 such that iterative assignment may continue until all power drawing components have been assigned to one or more circuits. If, all power drawing components have been assigned, the iterative assignment phase may be complete and the method may terminate. Reassignment of one or more power drawing components to reduce an imbalance in power loads between circuits (e.g., operation 520) may then be performed in accordance with some example embodiments.

FIG. 7 illustrates a flowchart according to an example method for reassigning power drawing components to reduce an imbalance in power loads between circuits in accordance with some example embodiments. In this regard, FIG. 7 illustrates a method that may be used to facilitate performance of operation 520 as described above. One or more elements of the computing system 300, such as the cabling plan module 304, processing circuitry 310, processor 312, memory 314, system bus 316, mass storage 318, communication interface 320, and/or the user interface 322 may, for example, provide means for performing one or more of the operations illustrated in and described with respect to FIG. 7 in accordance with some example embodiments.

Operation 700 may include determining a difference in assigned power loads between circuits in each of at least one circuit pair. Operation 710 may include ordering the at least one circuit pair from the highest difference in assigned power loads to the lowest difference in assigned power loads.

Operation 720 may include determining if the difference in assigned power loads for a circuit pair is reducible by reassigning a power drawing component between circuits in the circuit pair. In this regard, operation 720 may include iteratively checking one or more circuit pairs to determine if a difference in assigned power loads is reducible beginning with the circuit pair having the highest difference in assigned power loads and continuing until either it is determined that the difference in assigned power load for a circuit pair is reducible or circuit pair having the lowest difference in assigned power loads is reached without finding a reducible difference.

Operation 730 may include determining if a circuit pair with a reducible difference in assigned power loads was identified. If it has been determined that there is not a circuit pair for which the difference in assigned power loads may be reduced, the method may terminate. If, however, a circuit pair for which the difference in assigned power loads may be reduced has been identified, operation 740 may include reassigning at least one power drawing component to reduce the difference in assigned power loads between circuits in the circuit pair. The method may then return to operation 700 for recalculation of the differences in assigned power loads. In this regard, performance of the method may be continued until it is no longer possible to reduce a difference in assigned power loads for any circuit pair.

FIG. 8 illustrates a portion of an example power cabling plan that may be generated in accordance with some example embodiments. In this regard, the power cabling plan of FIG. 8 may, for example, be generated attendant to performance of operation 530 in accordance with some example embodiments. It will be appreciated that the example power cabling plan of FIG. 8 is provided by way of example, and not by way of limitation. In this regard, other power cabling plan formats are contemplated within the scope of the disclosure. Moreover, a power cabling plan that may be generated in accordance with some example embodiments may omit some of the information contained in the example of FIG. 8 and/or may include alternative information compared to that contained in the example of FIG. 8. Further, some power cabling plans may include additional information beyond that included in the example of FIG. 8.

With reference to FIG. 8, the power cabling plan may be organized into a table, with rows representing respective connections and the columns organizing information describing the connection parameters. For example, column 802 may define the cable type. In some embodiments, the power cabling plan may be included in a comprehensive cabling plan including network cabling connections. As such, in some such embodiments, the cable type may indicate "Power" to distinguish from various non-power cables (e.g., network cables) that may be used to interconnect components of the computing system. Additionally or alternatively, the column 802 may identify a specific type of power cable to use for a connection, such as C13/C14, C19/C20, or the like. Column 804 may define the length of cable (e.g., in feet, meters, or other unit of measure) to use for the connection. Column 806 may include an identifier (ID) for the power cable. The cable ID may, for example, be in the form of a manufacturer part number, a part stocking number, such as a stock keeping unit (SKU) that may be used for inventory management, and/or the like. In some example embodiments, if the cable ID conveys both cable type and cable length information, the data in columns 802 and 804 may be omitted. Alternatively, the cable ID information may be omitted and the data in columns 802 and 804 may be used to uniquely identify the appropriate power cable to use for a connection. However, as illustrated in some example embodiments, each of a cable type, cable length, and cable ID (e.g., data contained in columns 802, 804, and 806) may be used to identify the appropriate power cable to use for a connection.

Columns 808 and 810 may identify the pair of ports (e.g., the power port on a power drawing component and the corresponding assigned PDU port) that is to be connected for a given connection. For example, column 808 may identify a first/source port for a connection, and column 810 may identify a second/destination port for the connection.

It will be understood that each block of the flowcharts in FIGS. 5-7, and combinations of blocks in the flowcharts, may be implemented by various means, such as hardware and/or a computer program product comprising one or more computer readable mediums having computer readable program instructions stored thereon. For example, one or more of the procedures described herein may be embodied by computer program instructions of a computer program product. In this regard, the computer program product(s) which may embody the procedures described herein may be stored by one or more memory devices (e.g., memory 314, mass storage 318, and/or other memory device) of a computing device and executed by a processor in the computing device (e.g., processor 312 and/or other processor). In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer readable memories on which the computer program instructions may be stored such that the one or more computer readable memories can cause a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s). Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

Moreover, it will be appreciated that the ordering of blocks and corresponding method operations within the flowcharts is provided by way of non-limiting example in order to describe operations that may be performed in accordance some example embodiments. In this regard, it will be appreciated that the ordering of blocks and corresponding method operations illustrated in the flowcharts is non-limiting, such that the ordering of two or more block illustrated in and described with respect to the flowchart may be changed and/or method operations associated with two or more blocks may be at least partially performed in parallel in accordance with some example embodiments. Further, in some embodiments, one or more blocks and corresponding method operations illustrated in and described with respect to the flowcharts may be optional, and may be omitted.

It will be further appreciated that operations illustrated in and described with respect to the flowcharts may be automatically performed without human intervention. In this regard, various example embodiments support automated generation of a cabling plan such that a cabling plan may be generated based on a set of one or more inputs without human intervention.

Functions in accordance with the above described embodiments may be carried out in many ways. In this regard, any suitable means for carrying out each of the functions described above may be employed to carry out various embodiments. In some embodiments, a suitably configured processor (e.g., processor 312) may provide all or a portion of the elements. In other embodiments, all or a portion of the elements may be configured by and operate under control of a computer program product. The computer program product for performing the methods of various embodiments of includes at least one computer readable storage medium having computer readable program code stored thereon. The computer readable medium (or media) may, for example, be embodied as and/or otherwise include the memory 314 and/or mass storage 318. However, it will be appreciated that a computer program product in accordance with various example embodiments may include any data storage device (e.g., a non-transitory computer readable storage medium) that can store data, which can be thereafter read by a computer system. Examples of the computer readable storage media include hard drives, network attached storage (NAS), read-only memory, random-access memory, one or more digital versatile disc (DVDs), one or more compact disc read only memories (CD-ROMs), one or more compact disc-recordable discs (CD-Rs), one or more compact disc-rewritable discs (CD-RWs), one or more Blu-Ray discs, magnetic tapes, flash memory, some combination thereof, and/or other optical and non-optical data storage devices. Some example embodiments may additionally or alternatively use computer readable storage media distributed over a network coupled computer system such that the computer readable code may be stored and executed in a distributed fashion.

Embodiments utilizing a computer program product and/or otherwise employing various computer-implemented operations may employ operations involving data stored in computer systems. These operations include those requiring physical manipulation of physical quantities. In some instances, though not all, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. Moreover, it will be appreciated that a non-transitory computer readable storage medium storing program instructions configured to carry out operations in accordance with one or more embodiments constitutes an article of manufacture.

The disclosed embodiments also relate to a device or an apparatus for performing these operations. The apparatus may be specially constructed to perform a particular embodiment(s), or the apparatus can be a general-purpose computer selectively activated or configured by a computer program stored in and/or otherwise accessible by the computer such that the general-purpose computer is configured to perform operations in accordance with one or more embodiments.

Embodiments described herein may be practiced with various computer system configurations including blade devices, cloud systems, converged infrastructure systems, rack mounted servers, switches, storage environments, hand-held devices, tablets, microprocessor systems, microprocessor-based or programmable consumer electronics, minicomputers, mainframe computers and the like. Some embodiments may also be practiced in distributed computing environments where tasks are performed by remote processing devices that are linked through one or more networks, such as one or more wireline networks and/or one or more wireless networks.

Many modifications and other embodiments of the inventions set forth herein will come to mind to one skilled in the art to which these disclosed embodiments pertain having the benefit of the teachings presented in the foregoing descriptions and the associated drawings. Therefore, it is to be understood that embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. may be used herein to describe various steps or calculations, these steps or calculations should not be limited by these terms. These terms are only used to distinguish one operation or calculation from another. For example, a first calculation may be termed a second calculation, and, similarly, a second step may be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

The invention claimed is:

1. A method for generating a power cabling plan for components mounted in a rack, the method comprising:
   accessing a build plan for the rack, the build plan identifying a plurality of power drawing components and a plurality of power distribution units (PDUs), wherein each PDU comprises the at least one circuit;
   iteratively assigning each of the plurality of power drawing components to the at least one circuit based at least in part on an existing power load assigned to each circuit and an amount of power drawn by the power drawing components;
   after assigning each of the plurality of power drawing components to the at least one circuit, determining a difference in assigned power loads between circuits in each of at least one circuit pair;
   determining if the difference in assigned power loads between circuits in any circuit pair of the at least one circuit pair is reducible by reassigning the at least one power drawing component between circuits in a circuit pair;
   in the instance in which it is determined that the difference in assigned power loads between circuits in one or more circuit pairs of the at least one circuit pair is reducible, reassigning the at least one power drawing component to reduce the difference in assigned power loads between circuits in the one or more circuit pairs; and
   generating a power cabling plan defining at least one assigned PDU port for each of the plurality of power drawing components, wherein each assigned PDU port corresponds to a circuit to which the power drawing component has been assigned based at least in part on the iteratively assigning and on any subsequent reassignment of one or more power drawing components performed in an instance in which it is determined that the difference in assigned power loads between circuits in one or more circuit pairs of the at least one circuit pair is reducible,
   wherein the method is performed by processing circuitry.

2. The method of claim 1, wherein the plurality of power drawing components comprise one or more compute components, one or more storage components, and one or more network components.

3. The method of claim 1, wherein:
   the build plan comprises an elevation plan defining a vertical arrangement of the plurality of power drawing components within the rack; and
   iteratively assigning comprises iteratively assigning each of the plurality of power drawing components to at least one circuit in an order corresponding to the vertical arrangement of the plurality of power drawing components within the rack.

4. The method of claim 1, further comprising:
   determining, for each of at least one of the plurality of power drawing components, a number of power connections used by the power drawing component; and
   wherein iteratively assigning each of the plurality of power drawing components to at least one circuit comprises iteratively assigning each of the at least one of the plurality of power drawing components to a number of circuits corresponding to the number of power connections used by the power drawing component.

5. The method of claim 1, wherein iteratively assigning each of the plurality of power drawing components to at least one circuit comprises assigning a power drawing component to a circuit having a lowest assigned power load of available circuits, wherein if multiple circuits have the lowest assigned power load and one of the circuits having the lowest assigned power load is implemented on a PDU having fewer assigned connections than any other PDU on which a circuit having the lowest assigned power load is implemented, the power drawing component is assigned to the circuit implemented on the PDU having fewer assigned connections.

6. The method of claim 1, wherein each of determining the difference in assigned power loads between circuits in each of at least one circuit pair, determining if the difference in assigned power loads between circuits in any circuit pair of the at least one circuit pair is reducible, and reassigning at least one power drawing components to reduce the difference in assigned power loads between circuits in the one or more circuit pairs is repeated until the difference in assigned power loads cannot be reduced for any circuit pair.

7. The method of claim 1, wherein the power cabling plan for components mounted in a rack further defines a type of power cable to use for each connection between a power drawing component and a PDU port to which the power drawing component is assigned.

8. The method of claim 1, further comprising:
determining, for each of at least one of the plurality of power drawing components, a cable length to use to connect the power drawing component to a PDU port to which the power drawing component is assigned based at least in part on a mount position of the power drawing component within the rack and a location of the PDU port to which the power drawing component is assigned,
wherein the power cabling plan for components mounted in a rack further defines, for each of the at least one of the plurality of power drawing components, the determined cable length to use to connect the power drawing component to the PDU port to which the power drawing component is assigned.

9. The method of claim 1, further comprising:
verifying, for each of at least one of the plurality of power drawing components based at least in part on a mount position of the power drawing component and a location of the PDU port to which the power drawing component is assigned, that a cable length is sufficient to connect the power drawing component to the PDU port to which the power drawing component is assigned; and
if it is determined that the cable length is not sufficient to connect the power drawing component to the PDU port to which the power drawing component is assigned, reassigning the power drawing component to one or both of another PDU port or another circuit.

10. The method of claim 1, wherein the plurality of PDUs are grouped into PDU pairs comprising a first PDU and a second PDU providing redundant power connections for power connections of the first PDU, and wherein the iteratively assigning and the reassigning comprises assigning each of the plurality of power drawing components to a circuit implemented on a first PDU in a respective PDU pair, and wherein the method further comprises, for each PDU pair:

mirroring assignments of power drawing components made based on the iteratively assigning and the reassigning to one or more circuits of the first PDU in the PDU pair to one or more corresponding circuits of the second PDU in the PDU pair,
wherein, for each power drawing component including a redundant power connection, the power cabling plan for components mounted in a rack defines redundant assignments to a PDU port on each of the first PDU and the second PDU in a PDU pair.

11. A computer program product comprising at least one non-transitory computer-readable storage medium having program instructions stored thereon which, when executed by at least one processor, cause the at least one processor to perform a method for generating a power cabling plan for components mounted in a rack, the method comprising:
accessing a build plan for the rack, the build plan identifying a plurality of power drawing components and a plurality of power distribution units (PDUs), wherein each PDU comprises the at least one circuit;
iteratively assigning each of the plurality of power drawing components to the at least one circuit based at least in part on an existing power load assigned to each circuit and an amount of power drawn by the power drawing components;
after assigning each of the plurality of power drawing components to at least one circuit, reassigning the at least one power drawing component between circuits in a circuit pair if the difference in assigned power loads between circuits in any circuit pair is reducible; and
generating a power cabling plan defining at least one assigned PDU port for each of the plurality of power drawing components, wherein each assigned PDU port corresponds to a circuit to which the power drawing component has been assigned based at least in part on the iteratively assigning and on any subsequent reassignment of one or more power drawing components if the difference in assigned power loads between circuits in any circuit pair is reducible.

12. The computer program product of claim 11, wherein the plurality of power drawing components comprise components of a computing system comprising one or more compute components, one or more storage components, and one or more network components.

13. The computer program product of claim 11, wherein:
the build plan comprises an elevation plan defining a vertical arrangement of the plurality of power drawing components within the rack; and
iteratively assigning comprises iteratively assigning each of the plurality of power drawing components to at least one circuit in an order corresponding to the vertical arrangement of the plurality of power drawing components within the rack.

14. The computer program product of claim 11, wherein the method further comprises:
determining, for each of at least one of the plurality of power drawing components, a number of power connections used by the power drawing component; and
wherein iteratively assigning each of the plurality of power drawing components to at least one circuit comprises iteratively assigning each of the at least one of the plurality of power drawing components to a number of circuits corresponding to the number of power connections used by the power drawing component.

15. The computer program product of claim 11, wherein iteratively assigning each of the plurality of power drawing components to at least one circuit comprises assigning a power drawing component to a circuit having a lowest assigned power load of available circuits, wherein if multiple circuits have the lowest assigned power load and one of the circuits having the lowest assigned power load is implemented on a PDU having fewer assigned connections than any other PDU on which a circuit having the lowest assigned power load is implemented, the power drawing component is assigned to the circuit implemented on the PDU having fewer assigned connections.

16. The computer program product of claim 11, wherein reassigning at least one power drawing component between circuits in a circuit pair if the difference in assigned power loads between circuits in any circuit pair is reducible comprises:
   determining a difference in assigned power loads between circuits in each of at least one circuit pair;
   determining if the difference in assigned power loads between circuits in any circuit pair of the at least one circuit pair is reducible by reassigning the at least one power drawing component between circuits in a circuit pair; and
   in an instance in which it is determined that the difference in assigned power loads between circuits in one or more circuit pairs of the at least one circuit pair is reducible, reassigning the at least one power drawing component to reduce the difference in assigned power loads between circuits in the one or more circuit pairs,
   wherein each of determining the difference in assigned power loads between circuits in each of at least one circuit pair, determining if the difference in assigned power loads between circuits in any circuit pair of the at least one circuit pair is reducible, and reassigning the at least one power drawing component to reduce the difference in assigned power loads between circuits in the one or more circuit pairs is repeated until the difference in assigned power loads cannot be reduced for any circuit pair.

17. The computer program product of claim 11, wherein the plurality of PDUs are grouped into PDU pairs comprising a first PDU and a second PDU providing redundant power connections for power connections of the first PDU, and wherein the iteratively assigning and the reassigning comprises assigning each of the plurality of power drawing components to a circuit implemented on a first PDU in a respective PDU pair, and wherein the method further comprises, for each PDU pair:
   mirroring assignments of power drawing components made based on the iteratively assigning and the reassigning to one or more circuits of the first PDU in the PDU pair to one or more corresponding circuits of the second PDU in the PDU pair,
   wherein, for each power drawing component including a redundant power connection, the power cabling plan for components mounted in a rack defines redundant assignments to a PDU port on each of the first PDU and the second PDU in a PDU pair.

18. A system for generating a power cabling plan for components mounted in a rack, the system comprising:
   at least one processor; and
   at least one memory storing computer program code, wherein the at least one memory and stored computer program code are configured, with the at least one processor, to cause the system to at least:
   access a build plan for the rack, the build plan identifying a plurality of power drawing components and a plurality of power distribution units (PDUs), wherein each PDU comprises the at least one circuit;
   iteratively assign each of the plurality of power drawing components to the at least one circuit based at least in part on an existing power load assigned to each circuit and an amount of power drawn by the power drawing components;
   after assigning each of the plurality of power drawing components to the at least one circuit, reassign the at least one power drawing component between circuits in a circuit pair if a difference in assigned power loads between circuits in any circuit pair is reducible; and
   generate a power cabling plan defining at least one assigned PDU port for each of the plurality of power drawing components, wherein each assigned PDU port corresponds to a circuit to which the power drawing component has been assigned based at least in part on the iterative assignment and on any subsequent reassignment of one or more power drawing components if the difference in assigned power loads between circuits in any circuit pair is reducible.

19. The system of claim 18, wherein the at least one memory and stored computer program code are configured, with the at least one processor, to cause the system to iteratively assign each of the plurality of power drawing components to at least one circuit at least in part by:
   assigning a power drawing component to a circuit having a lowest assigned power load of available circuits, wherein if multiple circuits have the lowest assigned power load and one of the circuits having the lowest assigned power load is implemented on a PDU having fewer assigned connections than any other PDU on which a circuit having the lowest assigned power load is implemented, the power drawing component is assigned to the circuit implemented on the PDU having fewer assigned connections.

20. The system of claim 18, wherein the at least one memory and stored computer program code are configured, with the at least one processor, to cause the system to reassign the at least one power drawing component between circuits in a circuit pair if a difference in assigned power loads between circuits in any circuit pair is reducible at least in part by:
   determining a difference in assigned power loads between circuits in each of at least one circuit pair;
   determining if the difference in assigned power loads between circuits in any circuit pair of the at least one circuit pair is reducible by reassigning the at least one power drawing component between circuits in a circuit pair; and
   in an instance in which it is determined that the difference in assigned power loads between circuits in one or more circuit pairs of the at least one circuit pair is reducible, reassigning the at least one power drawing component to reduce the difference in assigned power loads between circuits in the one or more circuit pairs,
   wherein each of determining the difference in assigned power loads between circuits in each of at least one circuit pair, determining if the difference in assigned power loads between circuits in any circuit pair of the at least one circuit pair is reducible, and reassigning the at least one power drawing component to reduce the difference in assigned power loads between circuits in the one or more circuit pairs is repeated until the difference in assigned power loads cannot be reduced for any circuit pair.

* * * * *